United States Patent [19]

Scott

[11] 4,043,139
[45] Aug. 23, 1977

[54] PIPE HOLDING TOOL

[76] Inventor: Winfield B. Scott, 58 Rough Creek Estate, Granbury, Tex. 76048

[21] Appl. No.: 633,255

[22] Filed: Nov. 19, 1975

[51] Int. Cl.$^2$ ............................................. B63B 35/04
[52] U.S. Cl. ....................................... 61/105; 248/49; 248/156; 248/413
[58] Field of Search ................. 248/49, 161, 413, 156, 248/74 R, 80, 87, 88, 188.5; 61/72.1, 105; 214/1 PA; 294/103 R; 138/105, 106

[56] References Cited

U.S. PATENT DOCUMENTS

| 195,186 | 9/1877 | Tyner | 294/103 R |
|---|---|---|---|
| 879,052 | 2/1908 | Jeranek | 248/156 X |
| 1,052,234 | 2/1913 | Gaertner | 294/103 R |
| 1,289,995 | 12/1918 | Wrage | 248/74 R X |
| 1,520,840 | 12/1924 | Murray | 138/105 X |
| 2,480,924 | 9/1949 | Heger | 294/103 R X |
| 2,942,822 | 6/1960 | Crow | 248/88 |
| 2,978,840 | 4/1961 | Tatsch | 248/49 X |
| 3,519,234 | 7/1970 | Matson | 248/156 |
| 3,568,455 | 3/1971 | McLaughlin et al. | 248/49 X |
| 3,895,496 | 7/1975 | Perrott et al. | 61/72.1 X |

FOREIGN PATENT DOCUMENTS

| 263,815 | 7/1964 | Australia | 248/88 |
|---|---|---|---|
| 110,380 | 4/1944 | Sweden | 248/74 R |

Primary Examiner—Roy D. Frazier
Assistant Examiner—Rodney H. Bonck
Attorney, Agent, or Firm—Wofford, Felsman, Fails & Zobal

[57] ABSTRACT

A tool for positioning and holding pipe to be laid in a ditch at a desired level while the ditch is filled partially with rock, gravel, etc. The tool comprises a rod located in a tubular member and having a pointed end extending out of the tubular member. The tubular member and rod are movable axially relative to each other. A locking member is provided for securing the rod and the tubular member at a desired position relative to each other. A pipe supporting means is carried by the tool and is fixed in place relative to the tubular member. In addition, a pipe locking means is supported for movement between a closed position and an open position. In the closed position, the pipe locking means forms an enclosed or partially enclosed configuration with the pipe supporting means for holding the pipe in a position such that its axis is generally transverse with the axis of the tubular member or that of the rod.

6 Claims, 5 Drawing Figures

PIPE HOLDING TOOL

BACKGROUND OF THE INVENTION

The present invention is directed to a tool for use for positioning and holding pipe in a ditch at a desired level while it is being partially filled with rock, gravel, etc.

In laying pipe in a ditch, it is necessary to partially fill the bottom of the ditch with rock, gravel or other material to facilitate drainage and to support the pipe in a level position in/or on the layer of the rock or gravel while the ditch is filled to the top with dirt, etc. The layer of rock, gravel, etc. may be inserted into the ditch first and the pipe laid on this layer however, this is a time consuming and hence costly operation since it requires the top of the layer to be leveled before the pipe is laid in place.

SUMMARY OF THE INVENTION

It is an object of the present invention to provide a tool for use for positioning and holding pipe in a ditch at a desired level while it is being parially filled with rock, gravel, etc. After the rock, gravel, etc. has been inserted in the ditch, the tool may be readily removed from the pipe and from the ditch, leaving the pipe at the desired level supported by the rock, gravel, etc.

The tool comprises an elongated member and a rod having a pointing end adapted to be inserted in the ground. The elongated member and the rod are movable relative to each other along their axes. In addition there is provided means for securing the rod and the elongated member at a desired position relative to each other. A pipe supporting means is carried by the tool and fixed in place relative to the elongated member. In addition pipe locking means is supported for movement between a closed position and an open position. When in the closed position, the pipe locking means forms an enclosed or partially enclosed configuration with the pipe supporting means for holding a pipe in a position such that its axis is genrally transverse with the axes of the rod and the elongated member.

In the embodiment disclosed, the elongated member comprises a tubular member. The rod is located in the tubular member with its pointed end extending out of one end thereof. The pipe locking means comprises rod means supported for movement in a direction generally parallel with the axes of said rod and said tubular member. Preferably spring means is provided for normally urging said pipe locking means toward said closed position.

In one embodiment, said pipe supporting means is connected to said tubular member near said one end and extends sideward therefrom. Said pipe locking means comprises a pipe locking member extending sidewardly from said rod means. In addition guide means is provided for maintaining said pipe locking member in the plane of said pipe supporting means.

DETAILED DESCRIPTION OF THE INVENTION

Figure 1:
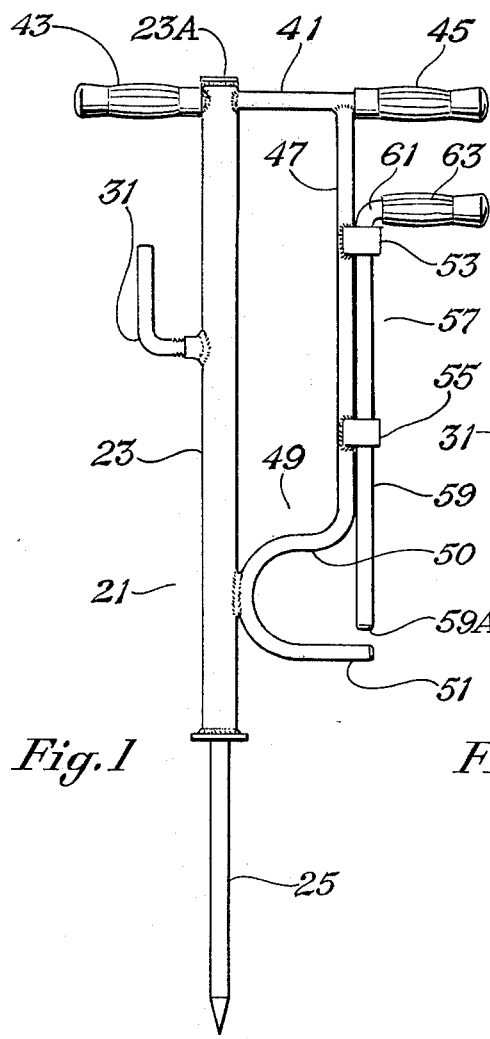
FIG. 1 is a side view of one embodiment of the pipe holding tool of the present invention.
Figure 2:
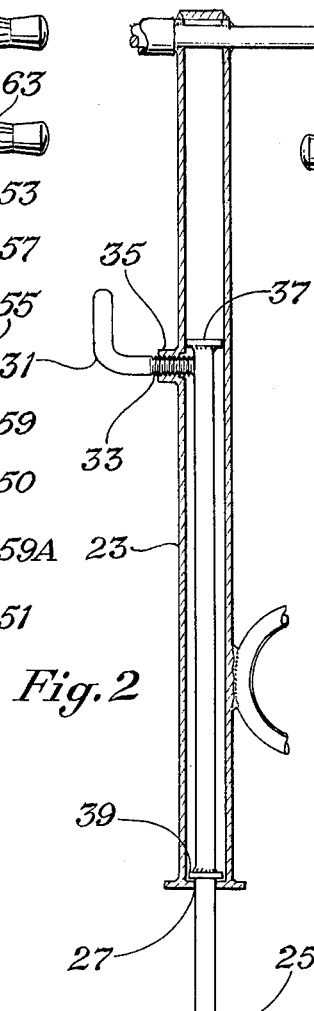
FIG. 2 is a partial cross-sectional view of the tool of FIG. 1.

Referring now to FIGS. 1 and 2, the pipe holding tool is identified at 21 and comprises a tubular member 23 having a rod 25 located therein. The rod extends through an aperture 27 formed in the lower end of the tubular member and has a pointed end 29 adapted to be inserted into the ground. The rod 25 and tubular member 23 are movable axially relative to each other. A locking member 31 is threaded through the tubular member 23 for engaging the rod to hold or secure the rod and the tubular member at a desired position relative to each other. As shown in the drawings, the locking member 31 comprises an L-shaped member having a threaded end 33 which is threaded through a nut like member 35 welded to the wall of the tubular member 23. Washers 37 and 39 are welded to the rod 25 at its top end and at a position intermediate its top end and pointed end respectively to limit movement of the rod in the tubular member and to prevent the rod from being removed from the tubular member. A top cap 23A is welded to the top end of the tubular member 23.

Welded to the top end of the tubular member is a rod 41 to which two hand grips 43 and 45 are attached. Welded to the rod 41 is another rod 47 which extends downwardly. The lower end of the rod 47 is formed into a U-shaped member 49 which also is welded to the tubular member 23 near the lower end thereof. The U-shaped member 49 has an upper arm 50 and a lower arm 51, the latter of which extends sidewardly or transversely from the tubular member 23 and forms a support for supporting the bottom of the pipe to be laid.

Attached to the rod 47 at spaced apart positions are two ring-shaped guides 53 and 55. A pipe locking member 57 comprising a rod 59 is supported in the ring guides for downward movement to a closed position as shown in FIG. 1 and to an upward open position. In the closed position, the lower end of the rod 59 forms an enclosed or partially enclosed configuration for holding and securing the pipe to be laid in a position such that its axis is generally transverse with the axis of the tubular member 23. The upper end of the locking rod 59 has a transverse portion 61 to which a grip 63 is attached to form a handle. When the rod 59 is moved upward to an open position, the lower end 59A of the rod of 59 is moved upward to about the level of the arm 50 of the U-shaped member 49 whereby a pipe may be inserted in the U-shaped member 49 or removed therefrom.

The pipe holding tool may be used in the following manner. The locking member 31 is unthreaded or loosened to allow the rod 25 to slide freely in the tubular member 23. The rod 25 is then moved toward the top end of the tubular member 23 a distance such that the top end of the rod 25 is positioned immediately locking member 31 and the top end of the tubular member 23. The locking member 31 then is threaded inward or tightened to allow its threaded end to tightly engage the rod 25 to securely hold the rod 25 and the tubular member 23 in the desired position relative to each other.

Figure 3:
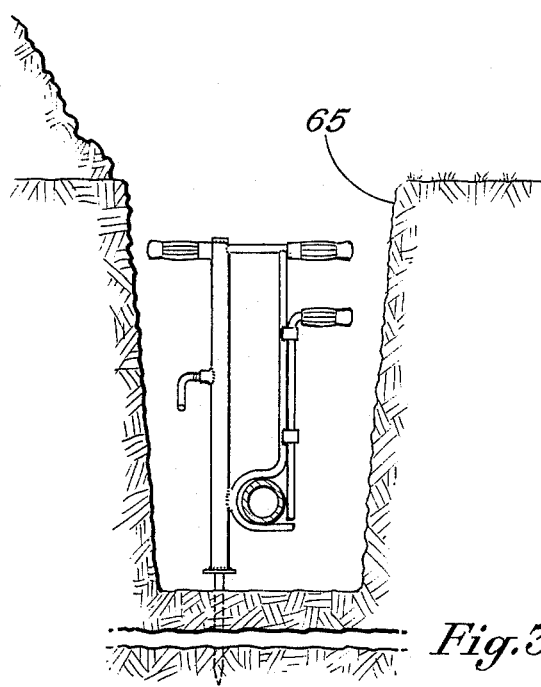
FIG. 3 illustrates the tool of FIG. 1 located in a ditch for positioning and holding a pipe at a desired level.

In FIG. 3, a ditch in which the pipe is to be laid is illustrated at 65. After the ditch is dug to the desired depth, a plurality of the tool holding devices are inserted into the ground in the bottom of the ditch at desired intervals for holding and securing the pipe to be laid. For example, the tools may be spaced apart at ten foot intervals. The tool may be inserted into the ground by applying pressure to the hand grips 43 and 45 to shove the pointed end 29 of the rod 25 into the ground or by tapping the top end cap 23A of the tubular member 23 with a tool to force the pointed end of the rod 25 into the ground. After the pointed end of the rod 25 of the tool has been inserted in the ground in the bottom of the ditch at the desired level or to a stable holding position, the handle 63 is raised to raise the locking rod 59 upward away from the closed position to allow the pipe or pipe section to be inserted in the U-shaped member 49 where it is supported by the arm 51. The handle 63 is then lowered to move the lower end 59A of the rod of the locking rod 59 to the closed position to lock the pipe or pipe section in place in the U-shaped member 49. This operation is carried out for each tool.

Preferably each tool is positioned such that the collar of the pipe is located next to the tool. After the pipe has been inserted and secured in the tools or after a number of pipe sections have been inserted and secured in the tools and their ends joined, the pipe is leveled by unthreading or unloosening the locking members 31 and raising or lowering the tubular member 23 relative to the rod 25 to position the pipe at the desired level. At the desired level, the locking member 31 is tightened or threaded into the tubular member 23. This is done for each tool. Thus, in this manner the pipe is located and held at a desired level position along its length.

Gravel, rock, etc., then is placed in the ditch to the desired level whereby the pipe is supported on or in the layer of gravel, rock, etc. The handle 63 of the locking member 57 is then raised to move the locking rod 59 upward away from the closed position and the tool is then turned or rotated about 45° or more to move the arm 51 of the U-shaped member 49 from under the pipe. The tool is then raised or lifted out of the back fill layer of rock, gravel, etc. leaving the pipe level and in the desired position on/or in the layer of gravel, rock, etc. Each tool is removed in the same manner. The ditch can then be filled to the top with dirt, etc.

Thus, it can be understood that by using the tool of the present invention, the pipe may be positioned and held in a ditch at a desired level while it is being partially filled with rock, gravel, et. After the rock, gravel, etc. has been inserted in the ditch the tool may be readily removed from the pipe and from the ditch, leaving the pipe at the desired level supported by the rock, gravel, etc.

Figure 4:
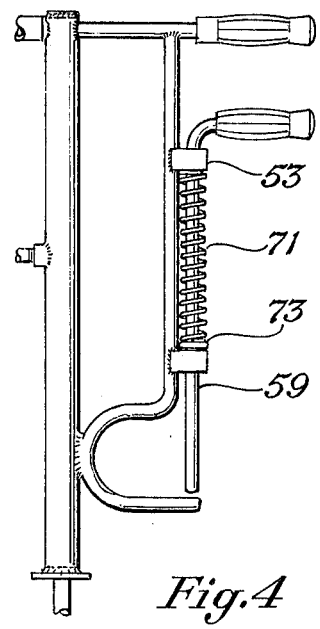
FIG. 4 is another embodiment of the pipe holding tool of the present invention.

Referring to FIG. 4, the tool shown is the same as that of FIG. 1 except that it has a compression spring 71 surrounding the locking rod 59 for urging the rod toward the closed position. As shown, the rod 59 has a washer 73 welded thereto intermediate its ends. The lower end of the spring 71 seats against the washer 73 and the upper ends seats against the ring guide 53 whereby the springs 71 urges the rod 59 toward the closed position.

Figure 5:
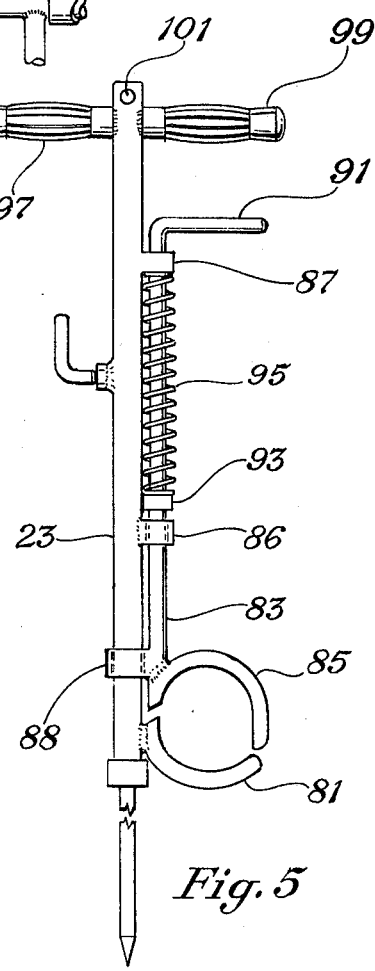
FIG. 5 illustrates the preferred embodiment of the pipe holding tool of the present invention.

Referring to FIG. 5, the embodiment therein is similar to that of FIG. 4, however, the pipe supporting means and the pipe locking means are modified. In this respect, the pipe supporting means comprises an arcuate member 81 having one end welded to the tubular member near its lower end. The other end of the arcuate member extends sidewardly or transversely outward from the tubular member. The pipe locking means comprises a rod 83 having an arcuate member 85 welded to its lower end and which transversely or sidewardly from the rod 83. Ring guides 86 and 87 are welded to the side of the tubular member for supporting the rod 83 for movement to a closed position as shown in FIG. 5 and for movement to an upward open position where the arcuate member 85 is spaced a distance from the arcuate member 81 to allow the pipe to be placed on the arcuate member 81 or removed therefrom. In the closed position, the arcuate member 85 forms an enclosed or partially enclosed configuration with the arcuate member 81 for holding and securing the pipe to the tool whereby its axis is generally transverse to the axis of the tubular member 23. A ring guide 88 is welded to the rod 83 and slidably surrounds the tubular member 23 to maintain the arcuate member 85 in the plane of the lower arcuate member 81. At its upper end the rod 83 is bent to form a transverse member 91 for forming a handle. A washer 93 is welded to the rod 83 intermediate its ends and a compression spring 95 surrounds the rod 83 and has one end seated against the washer 93 and its other end seated against the ring guide 87. This spring urges the locking member to its closed position.

A rod is welded through the upper end of the tubular member around which are fitted hand grips 97 and 99. An aperture 101 is formed through the upper end of the tubular member whereby a plurality of the tools may be racked or supported on a rod when not in use.

The tool of FIG. 5 is used in the same manner as is the tool of FIGS. 1 and 2 in supporting and holding a pipe to be laid in a ditch. In removing the tool from the pipe, after the back fill has been inserted in the ditch, it may be necessary to shove the tool further into the ground to provide enough space between the pipe and the outer end of arcuate support 81 to allow the tool to be rotated to move the arcuate support 81 from under the tool whereby the tool may be raised and removed from the back fill layer.

Although not shown, it is to be understood that a housing may be provided around the spring 95 to provide protection against dirt, etc. The housing may extend from the guide 86 to the guide 87.

The tool of the present invention may be used to hold and install pipe of many different sizes and of different material such as plastic, cast iron, etc.

I claim:

1. A pipe holding tool comprising:
an elongated tubular member,
a rod having a pointed end adapted to be inserted in the ground,
said rod being located in said tubular member with its pointed end extending out of one end of said tubular member,
said tubular member and said rod being movable relative to each other along their axes,
means for preventing said rod from extending out of the opposite end of said tubular member,
handle means connected to said opposite end of said tubular member,
means for securing said rod and said tubular member at a desired position relative to each other,
pipe supporting means carried by said tool and fixed in place relative to said tubular member,
said pipe supporting means being connected to said tubular member and extending sidewardly therefrom,
pipe locking means supported for movement, in a direction generally parallel with said axes of said rod and said tubular member, between a closed position and an open position, said pipe locking means when in said closed position forming an enclosed or partially enclosed configuration with said pipe supporting means for holding a pipe in a position such that its axis is generally transverse with said axes of said rod and said tubular member, said pipe locking means comprising rod means having an end extending to a position near but spaced from said handle means when said pipe locking means is in its closed position, and a handle connected to said end of said rod means.

2. The pipe holding tool of claim 1 comprising: spring means for normally urging said pipe locking means toward said closed position.

3. The pipe holding tool of claim 1 wherein: said pipe supporting means comprises a rigid member having a surface adapted to engage and support the bottom of a pipe.

4. The pipe holding device of claim 3 wherein:

said pipe supporting means is secured to said tubular member near said one end thereof, said means for securing said rod and said tubular member at a desired position relative to each other comprises a threaded member threaded into said tubular member and adapted to engage said rod in said tubular member.

5. The pipe holding device of claim 4 comprising:

means connected to said rod intermediate its ends and engagable with means formed at said one end of said tubular member for limiting the distance said pointed end of said rod may extend out of said one end of said tubular member.

6. The pipe holding device of claim 5 wherein:

said rigid member of said pipe supporting means has an arcuate shaped pipe supporting surface facing generally in a direction toward said opposite end of said tubular member, said pipe locking means comprises a pipe locking member extending sidewardly from said rod means and having an arcuate shaping pipe engaging surface facing generally in a direction toward said arcuate shaped pipe supporting surface of said rigid member of said pipe supporting means, and guide means for maintaining said pipe locking member in the plane of said rigid member of said pipe supporting means.

* * * * *